US 7,783,206 B2

(12) United States Patent
Reyna et al.

(10) Patent No.: US 7,783,206 B2
(45) Date of Patent: Aug. 24, 2010

(54) SYSTEM AND METHOD FOR MULTI-RATE, HIGH-SENSITIVITY CLOCK AND DATA RECOVERY WITH ADJUSTABLE DECISION THRESHOLD, RF INPUT, AND OPTICAL-TO-ELECTRICAL CONVERSION

(75) Inventors: Samuel P. Reyna, Baltimore, MD (US); Paul Andrew Jager, Millersville, MD (US); Michael Stephen Brown, Pasadena, MD (US)

(73) Assignee: Ciena Corporation, Linthicum, MD (US)

( * ) Notice: Subject to any disclaimer, the term of this patent is extended or adjusted under 35 U.S.C. 154(b) by 784 days.

(21) Appl. No.: 11/652,208

(22) Filed: Jan. 11, 2007

(65) Prior Publication Data

US 2008/0170859 A1 Jul. 17, 2008

(51) Int. Cl.
*H04B 10/06* (2006.01)
(52) U.S. Cl. ..................................... 398/202
(58) Field of Classification Search ............... 398/202
See application file for complete search history.

(56) References Cited

U.S. PATENT DOCUMENTS

2002/0130256 A1* 9/2002 Macki et al. ........... 250/227.21

2009/0175289 A1* 7/2009 Heston et al. ................ 370/419

OTHER PUBLICATIONS

Cisco ONS 15600. Data Sheet [online], Cisco Systems, 2004 [retrieved on Sep. 2, 2009]. Retrieved from the Internet <URL: http://web.archive.org/web/20050531043320/cisco.com/application/pdf/en/us/guest/products/ps4533/c1650/cdccont_0900aecd800f7550.pdf>.*

* cited by examiner

*Primary Examiner*—Nathan M Curs
(74) *Attorney, Agent, or Firm*—Clements Bernard PLLC; Christopher L. Bernard; Tyler S. Brown

(57) ABSTRACT

The present invention provides a system and method for multi-rate, high-sensitivity CDR, including a variable/adjustable decision threshold, RF input clock recovery, and OE conversion feature. The system includes an optical input connector, CDR circuit, decision threshold circuit, internal power supply, OE converter, external electrical output, and multiple clock outputs. The system is assembled in a single, stand-alone unit. The system includes an OC-192 data output, and OC-192 (9.953-10.709 GHz) and ¼ OC-48 (2.488-2.677 GHz) clock outputs. The decision threshold level is adjustable and optimized by a system user. The system is also used in combination with a digital communications analyzer. A recovered clock of the CDR circuit provides trigger for the DCA. The system includes an electrical input connector. Optionally, the system triggers directly from an RF electrical input in substitution of an optical input. The system is also used to convert an optical signal to an electrical signal, bypassing the CDR circuit.

14 Claims, 10 Drawing Sheets

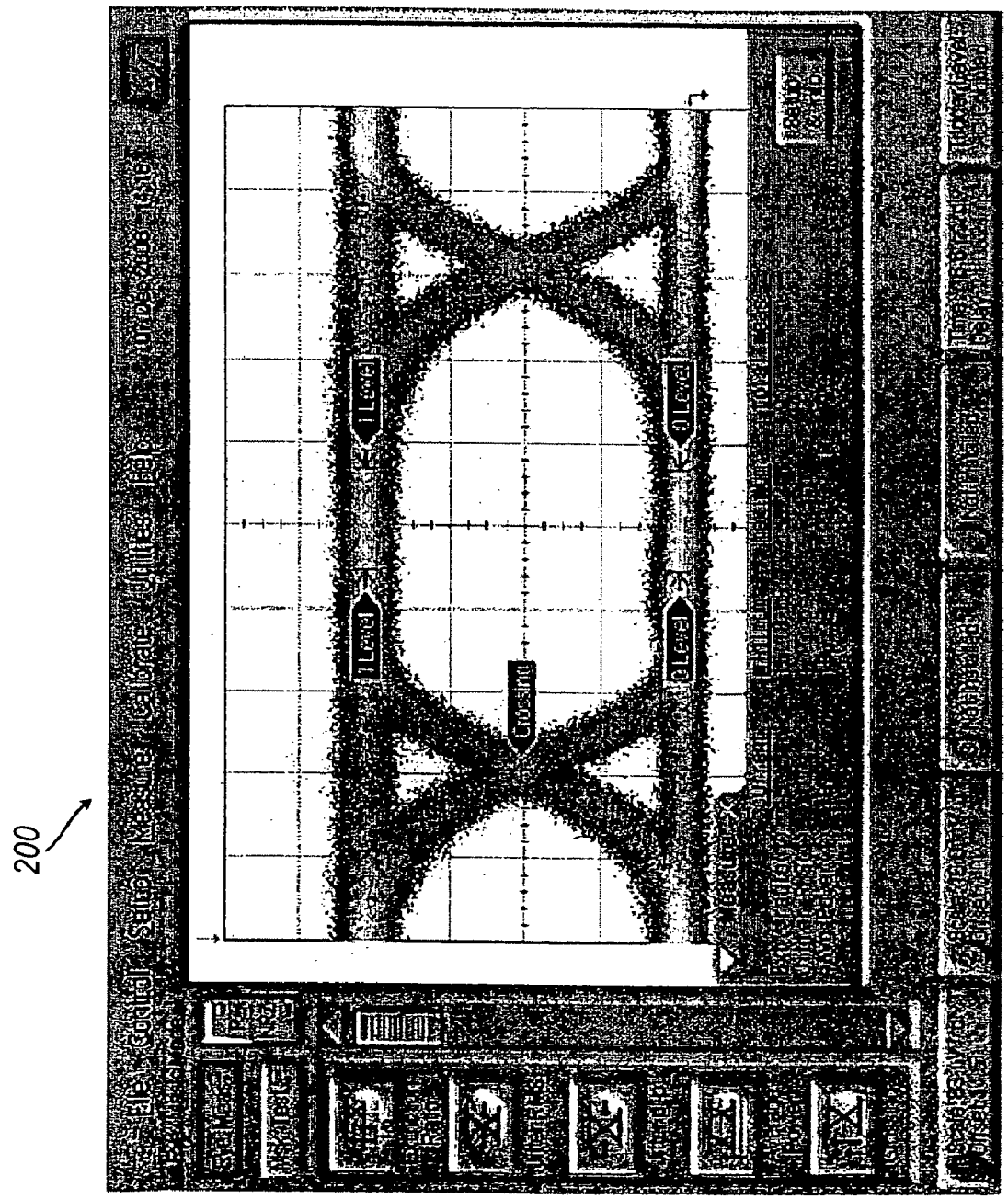
FIG. 2 (Prior Art -5 dBm)

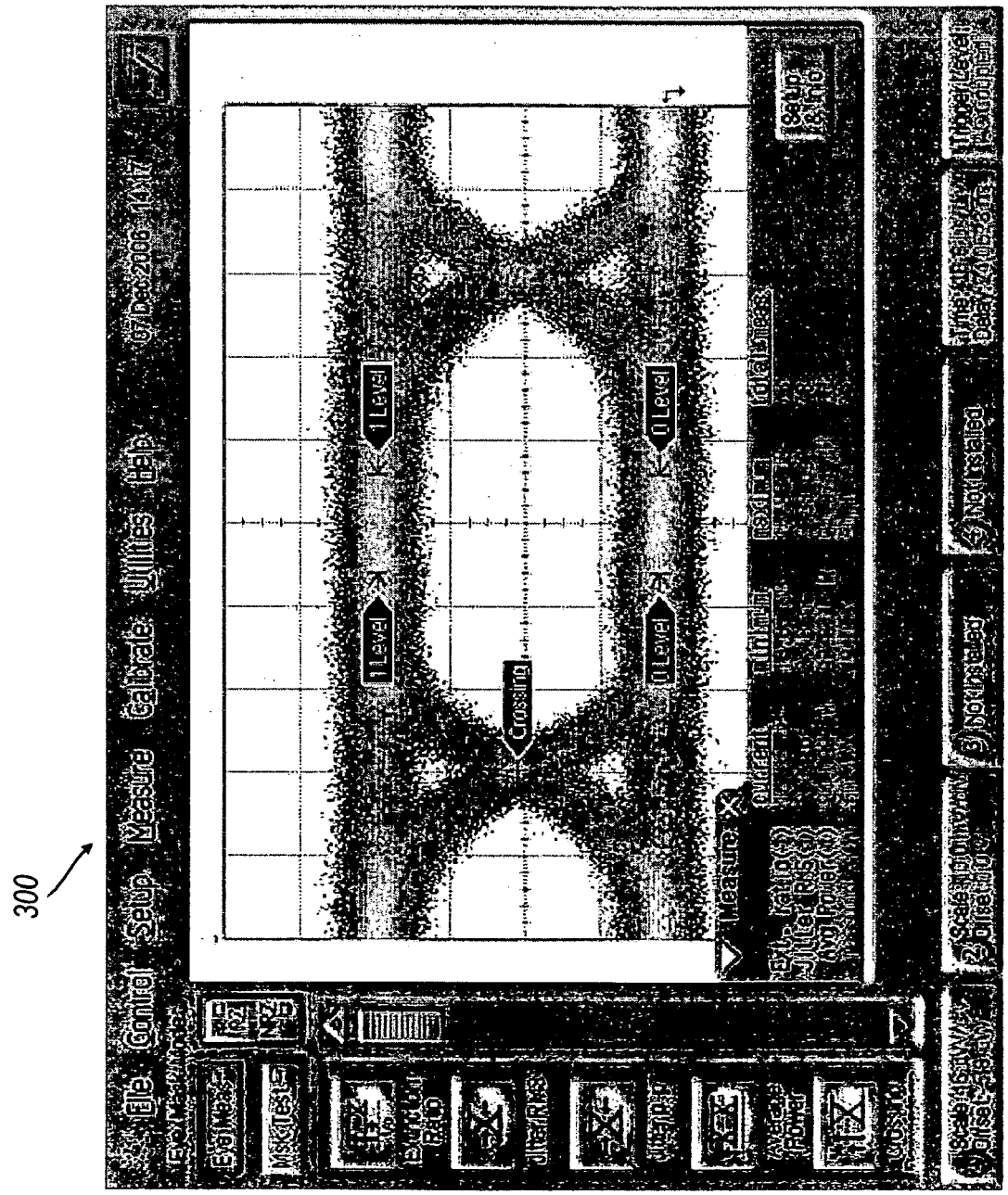
FIG. 3 (Prior Art -8 dBm)

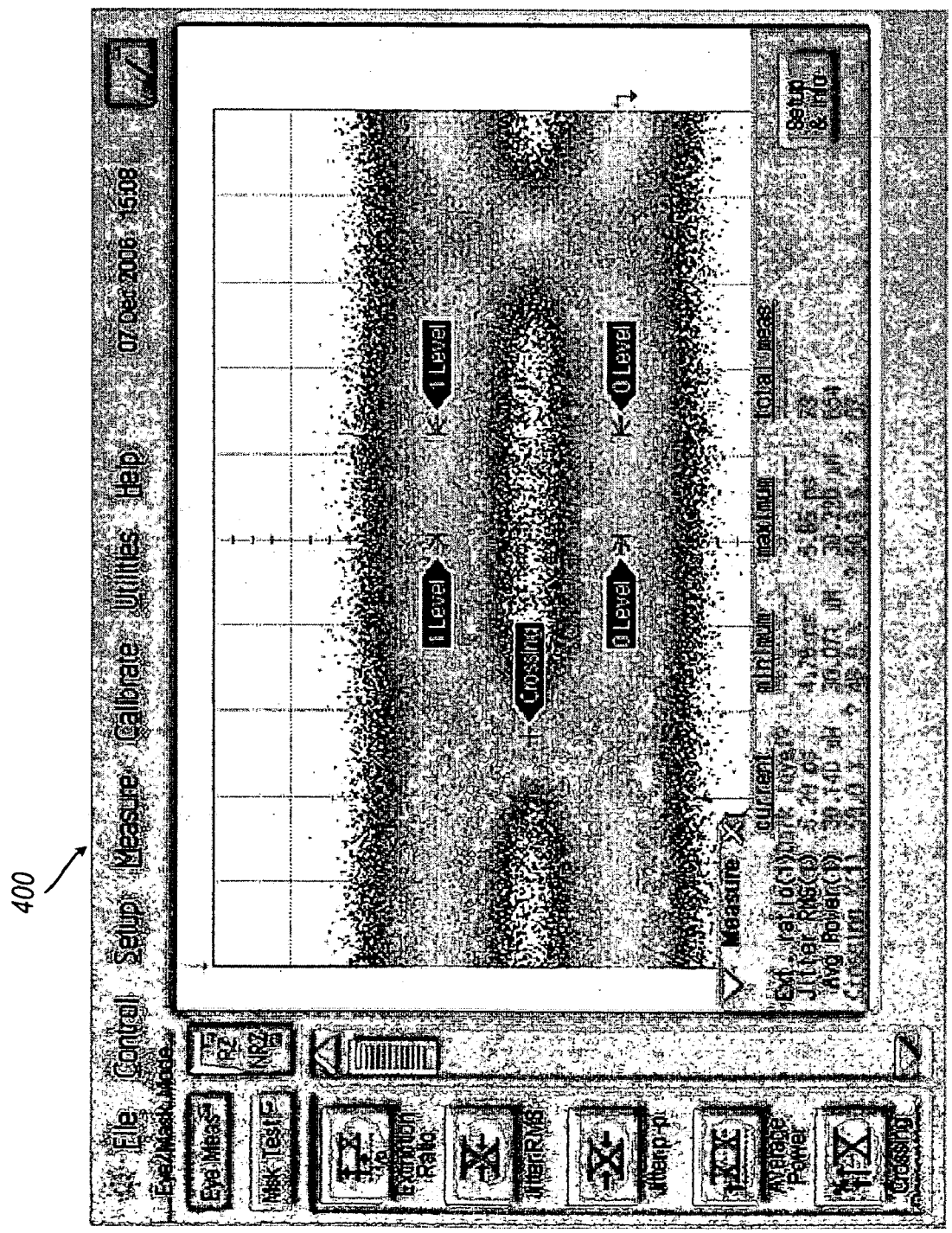
FIG. 4 (Prior Art -13 dBm)

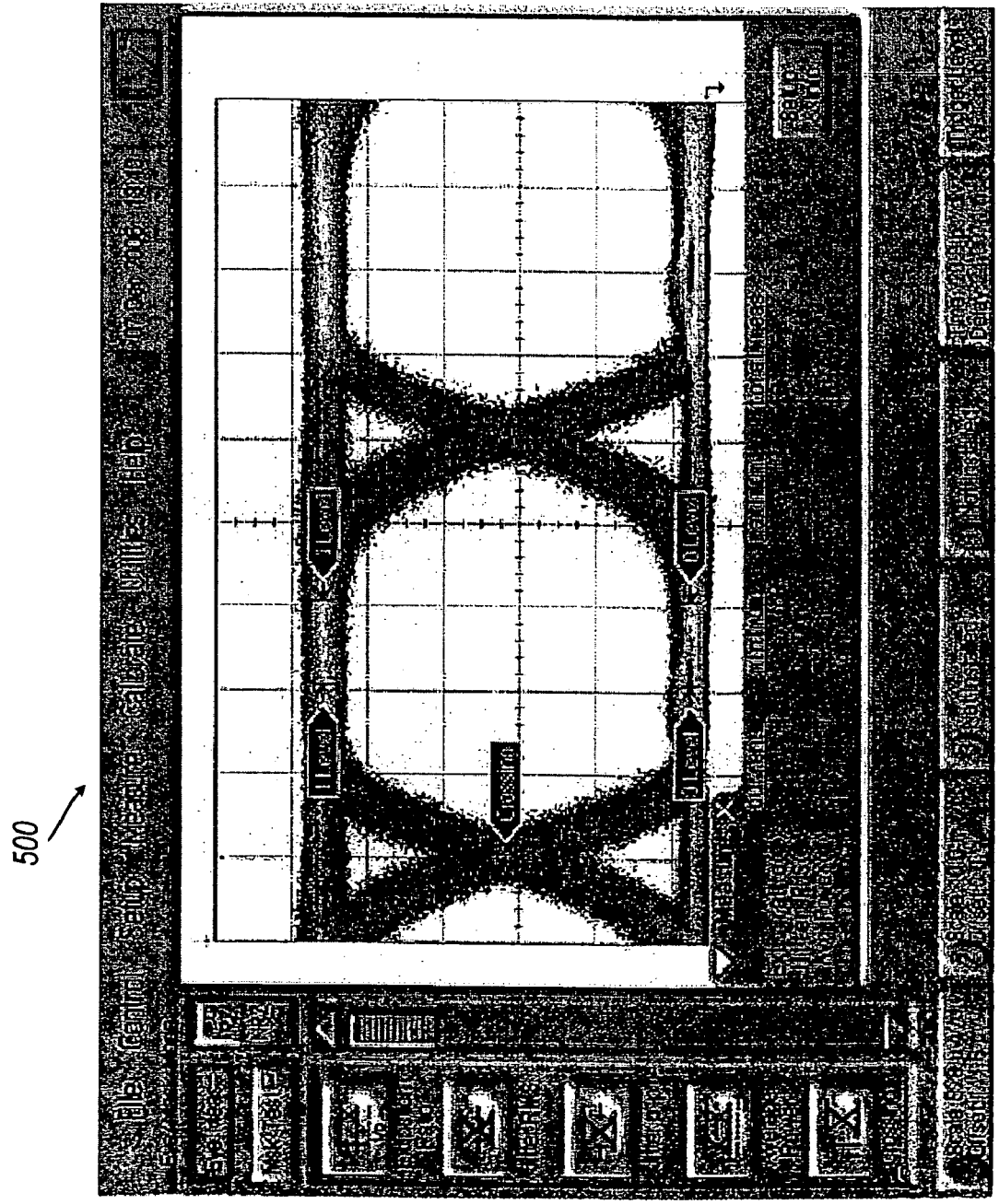
FIG. 5 (-5 dBm)

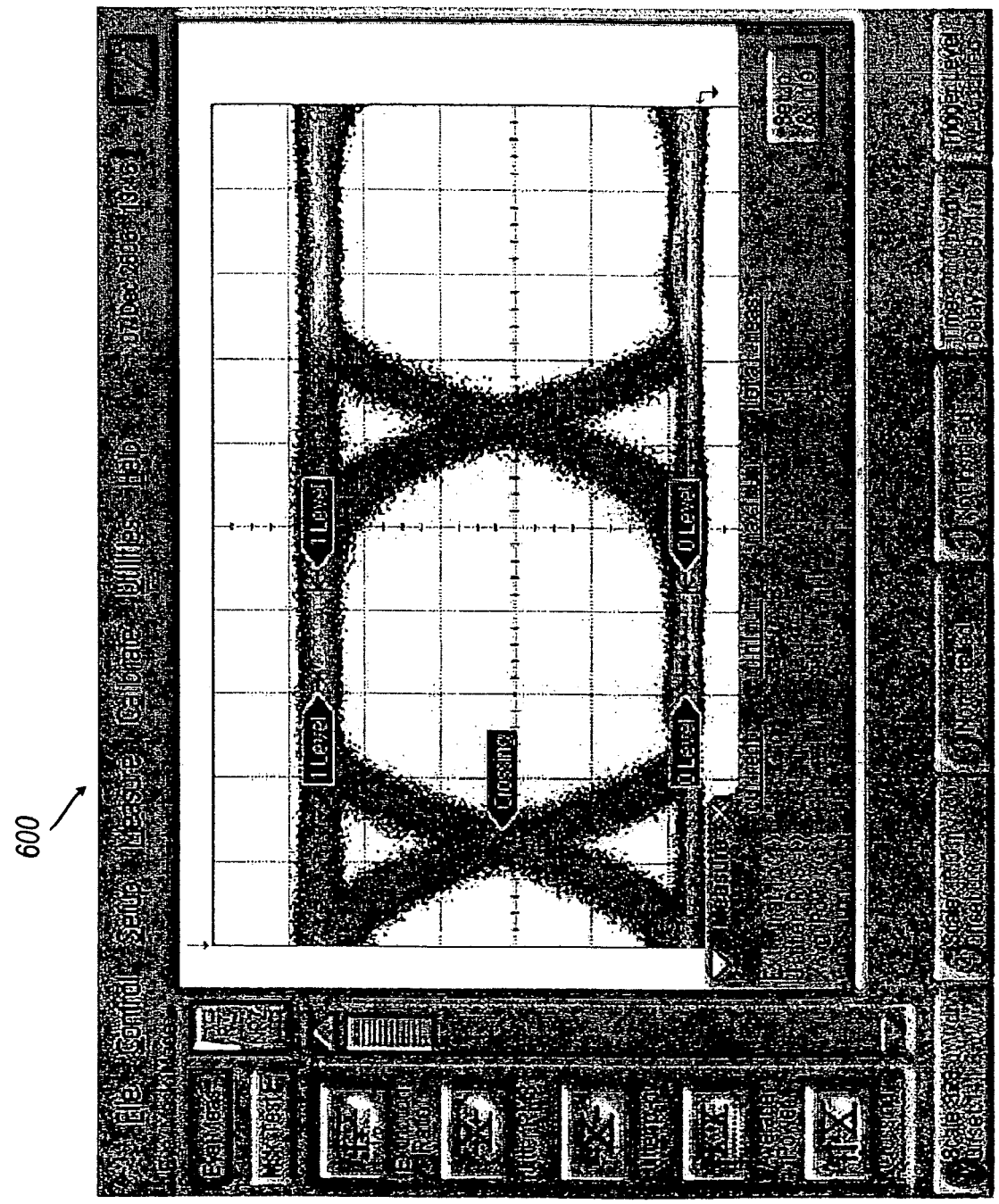
FIG. 6 (-13 dBm)

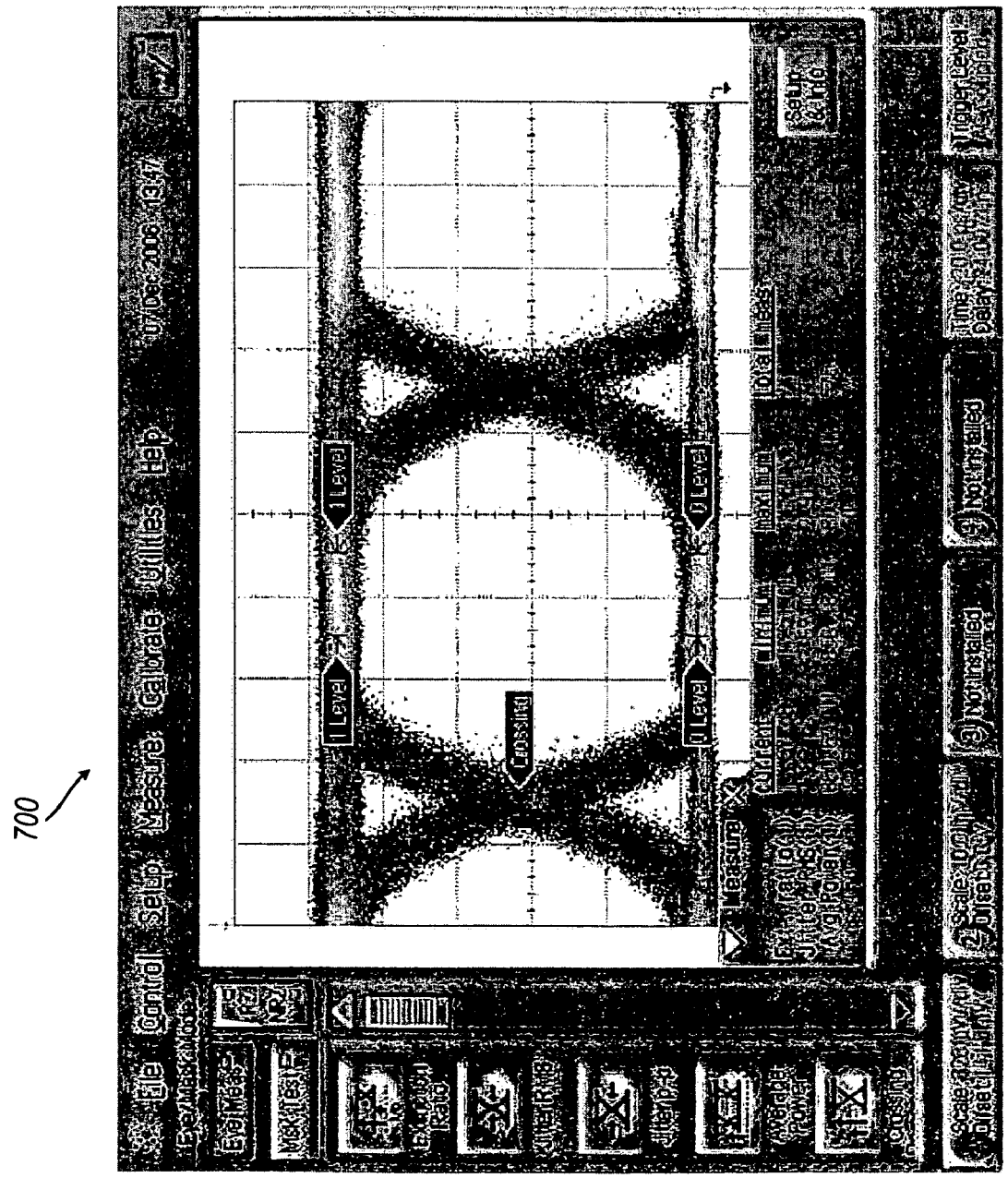
FIG. 7 (-21 dBm)

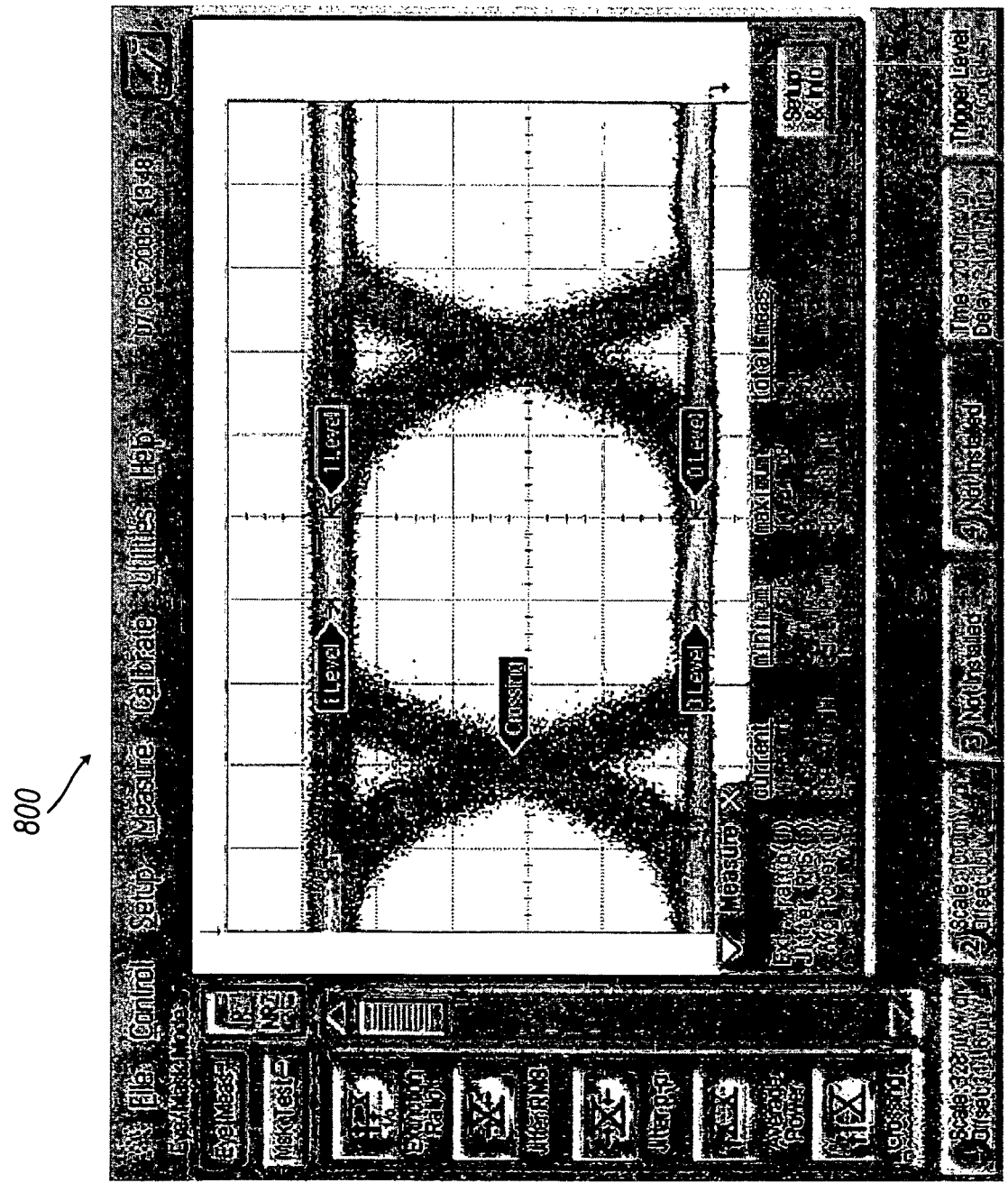
FIG. 8 (-23 dBm)

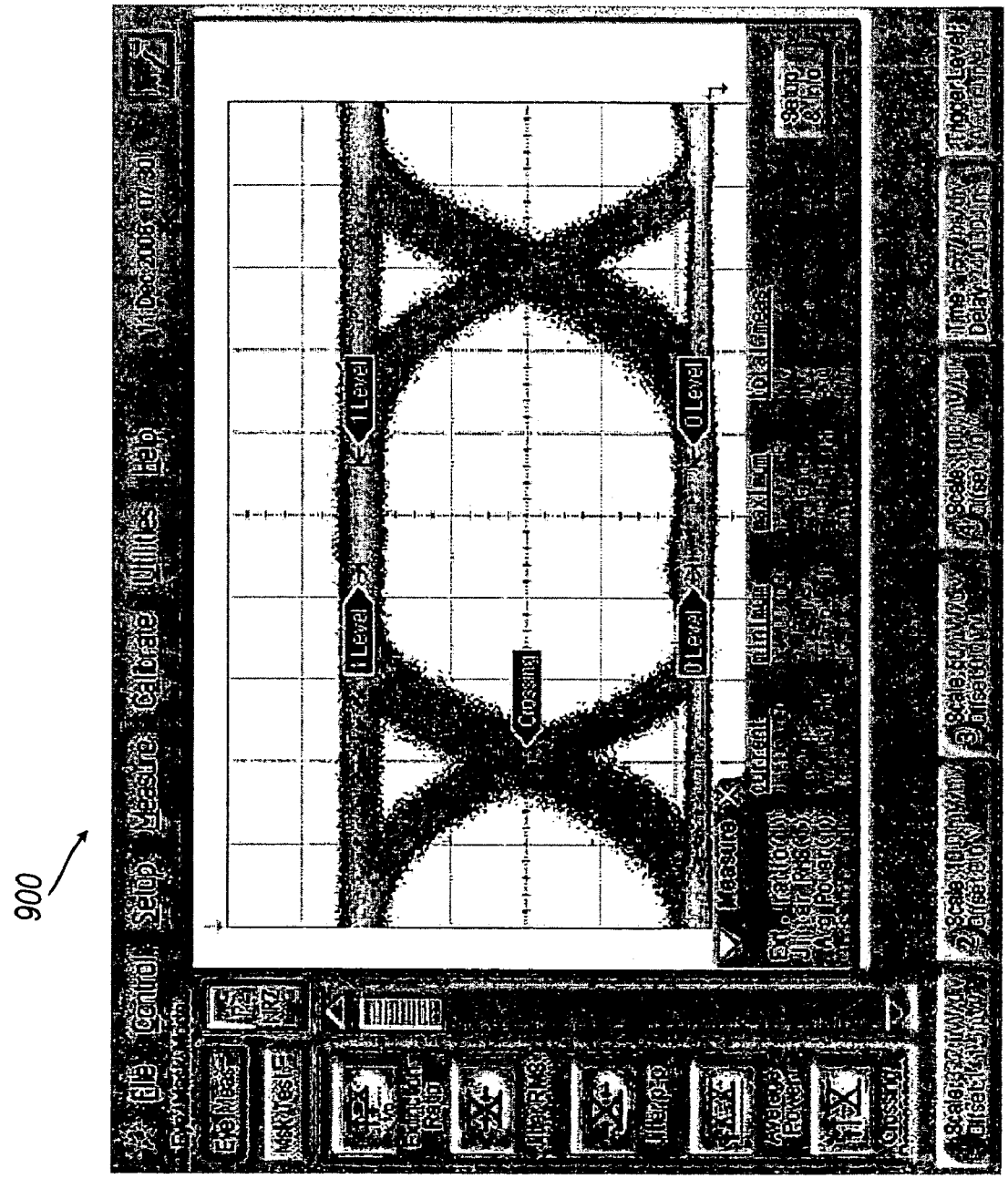
FIG. 9 (-2 dBm)

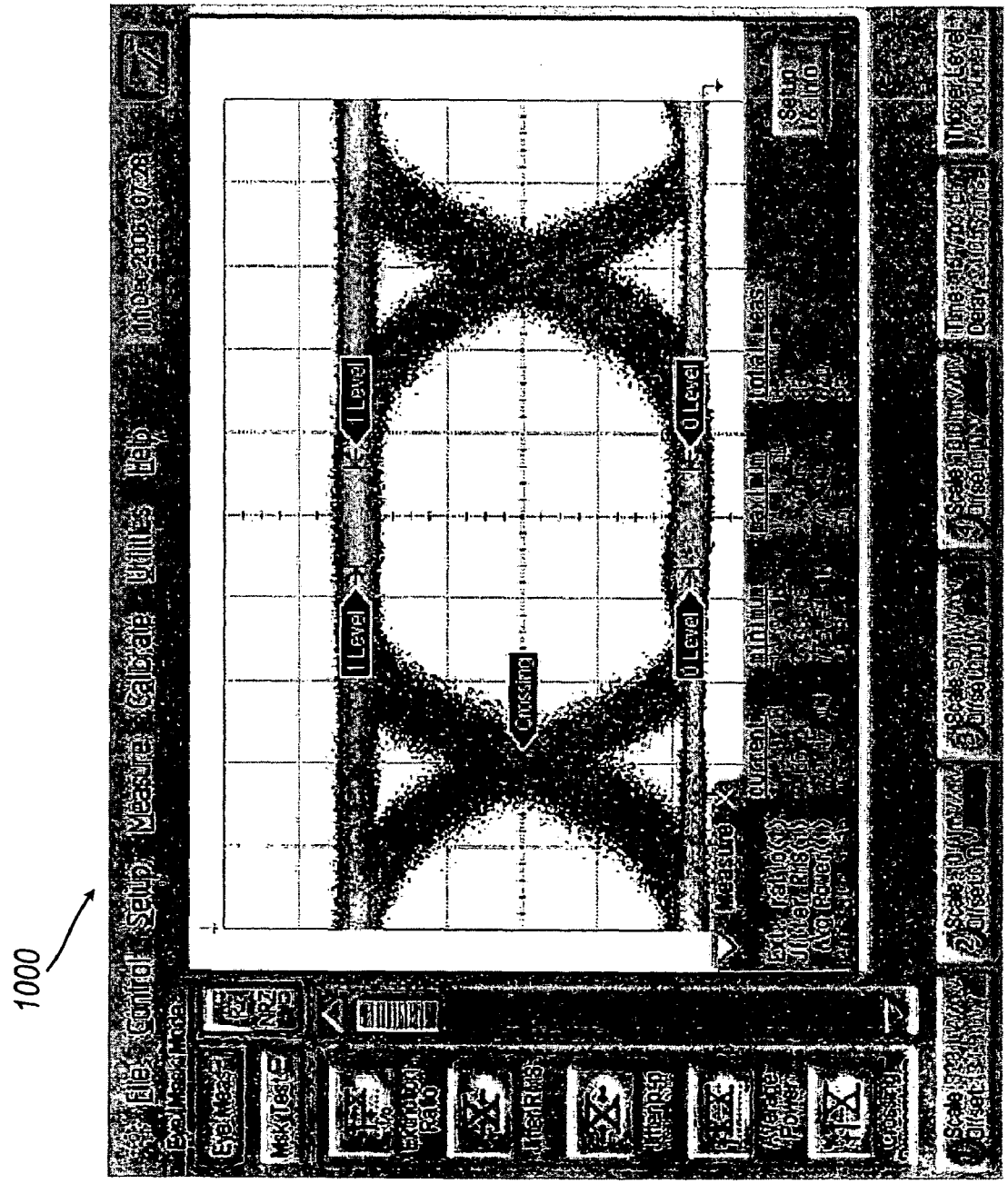
FIG. 10 (-30 dBm)

SYSTEM AND METHOD FOR MULTI-RATE, HIGH-SENSITIVITY CLOCK AND DATA RECOVERY WITH ADJUSTABLE DECISION THRESHOLD, RF INPUT, AND OPTICAL-TO-ELECTRICAL CONVERSION

FIELD OF THE INVENTION

The present invention relates generally to clock and data recovery in high-speed data streams. More specifically, the present invention relates to a system and method for OC-192 multi-rate, high-sensitivity clock and data recovery, including a variable/adjustable decision threshold, RF input clock recovery, and an optical-to-electrical conversion feature. The system and method also provide multiple clock outputs, including four selectable OC-192 clock outputs, four ¼ (OC-48) clock outputs derived from 9.953 Gb/s, 10.3125 Gb/s, 10.664 Gb/s, or 10.709 Gb/s, and an OC-192 data output derived from the same four selectable rates. The system further provides for the conversion of an optical signal to an electrical signal, bypassing the clock and data recovery circuit. The system is assembled as a stand alone, cost-efficient unit.

BACKGROUND OF THE INVENTION

In the field of data communications there often exists the need to recover the timing of a critically-timed transported signal. A trigger must be derived from the data itself when an external trigger is unavailable. This is particularly true within test, measurement, design, troubleshooting, diagnostic, and calibration applications requiring, or benefiting from, the use of multi-rate, high-sensitivity clock and data recovery.

Although there are many clock and data recovery (CDR) circuits and related devices, systems, and methods known in the art, many deficiencies also exist. For example, known CDR devices are often plug-in modules that do not provide the ability to use the device in a stand-alone manner. Known devices require that the user purchase a more expensive CDR plug-in module manufactured by the digital communications analyzer (DCA) manufacturer. This further assumes that unused channel or plug-in space is even available in the DCA mainframe. Additionally, known devices in the art often limit the user to a particular DCA manufacturer. Known devices are not compact such that they can be used easily and conveniently in a test station configuration with minimal space requirements. Known CDR devices are expensive to manufacture and use, relative to the system and method of the present invention. Additionally, known CDR devices provide a direct input level sensitivity that is unable to recover at lower level inputs. For example, measurement accuracy in known systems often degrades below approximately −8 dBm. Known CDR systems are unable to provide adequate trigger rates that are needed for optical/electrical testing. Furthermore, known CDR devices do not provide optical-to-electrical conversion as a component of the same system. Known CDR devices do not provide the multiple electrical clock outputs of both OC-192 and OC-48. Finally, many CDR devices known in the art require an optical input for RF electrical measurement and evaluation, and are unable to allow the system to trigger directly from an RF electrical input in substitution of an optical input. One that is known is a plug-in device and not a stand alone module.

Thus, what is needed is a stand-alone and cost-efficient system for OC-192 multi-rate, high-sensitivity clock and data recovery that includes a variable/adjustable decision threshold, RF input clock recovery, and an optical-to-electrical conversion feature. Additionally, what is needed is a CDR system that does not require an optical input for RF electrical measurement and evaluation. Additionally, what is needed is a CDR system that provides multiple electrical clock outputs. Furthermore, what is needed is a CDR system that also optionally is capable of converting an optical signal to an electrical signal, bypassing the clock and data recovery circuit. A CDR system is needed that does not limit its user to a particular DCA manufacturer. Finally, what is needed is a CDR system that provides all of the above in a single, stand-alone hardware unit. The present invention provides such a system.

BRIEF SUMMARY OF THE INVENTION

In various exemplary embodiments, the present invention provides a systems and methods for OC-192 multi-rate, high-sensitivity clock and data recovery, including a variable/adjustable decision threshold, RF input clock recovery, and an optical-to-electrical conversion feature. The system and method also provide multiple clock outputs, including a rate selectable OC-192 clock output, a rate selectable ¼ (OC-48) clock output, and a rate selectable OC-192 data output. The system is a stand alone, cost-efficient unit.

In one exemplary embodiment, the present invention provides a system for multi-rate, high-sensitivity clock and data recovery. The system includes a built-in connector for an optical input, a clock and data recovery circuit, a decision circuit, an internal power supply comprising a plurality of voltage supply sources, an optical-to-electrical converter, an external electrical output, and a plurality of clock outputs. The system provides clock and data recovery, optical-to-electrical conversion, and multiple clock outputs. The system for multi-rate, high-sensitivity clock and data recovery is comprised in a single, stand-alone hardware unit. The system also includes an OC-192 9.953-10.709 GHz data output. The system further includes an OC-192 (9.953-10.709 GHz) clock output and a ¼ OC-48 (2.488-2.677 GHz) clock output. The decision circuit includes a decision threshold level. The decision threshold level is adjustable and optimized by a user of the system. The internal decision circuitry provides an offset voltage for the on-board optical to electrical converter. The converted optical input signal is internally compared with this adjustable voltage to determine the output states of the O/E converter, what the converter would consider either a 0 or 1 dependent on where the threshold level is set. In the decision circuit, a potentiometer varies the gain of the end stage operational amplifier that feeds an offset voltage to the O/E converter. By manually adjusting the potentiometer on the printed circuit board, while decreasing input level and monitoring signal status or eye pattern quality on the DCA, the user can optimize this circuit for best input level response and signal recovery. Though the decision-threshold level can be adjusted by the user, the level is however preset and optimized in-house. The circuit performs clock and data recovery at four OC-192 data rates, including 9.953, 10.3125, 10.664, and 10.709 Gb/s. These data rates are digitally selectable and defined by the control switching configuration. The system has an optical input sensitivity range for detecting an optical signal measured from 0 dBm to approximately −23 dBm, with jitter increase on recovered signal from 0 dBm to −21 dBm of approximately less than 1 ps RMS. The unit may also be upgraded through hardware changes, to increase the direct input level sensitivity lower limit from −23 dBm to an enhanced limit of −30 dBm. Jitter increase from 0 dBm to −30 dBm less than 1 ps RMS. In either configuration however, signal recovery may be limited to actual input level sensitivity of the DCA selected by user in test configuration, meaning though the CDR unit itself has the ability to recover the clock of extremely low level input signals, attention must be given to ensure signal input level to DCA is within the DCA capability of sampling. The power supply also includes protection circuitry. The protection circuitry includes voltage surge and reverse polarity protection and over-current protection. Since current consumption is considerably low, current limit is set at 2 amps. The system is also used coupled to a digital communications analyzer. In such a combination, a recovered clock of the clock and data recovery circuit provides trigger for the digital communications analyzer. The system also includes a built-in connector for an external electrical input. Optionally, the system triggers directly from an RF electrical input in substitution of an optical input. RF signal evaluation is performed without the need for an optical input reference. An RF signal to be sampled is split between the clock and data recovery circuit and a digital communications analyzer, lock is achieved, and trigger provided. Finally, the system is also used to convert an optical signal to an electrical signal, bypassing the clock and data recovery circuit.

In another exemplary embodiment, the present invention provides a method for multi-rate, high sensitivity clock and data recovery. The method includes providing a built-in connector for an optical input, providing a clock and data recovery circuit, providing a decision threshold circuit, providing an internal power supply comprising a plurality of voltage supply sources, providing an optical-to-electrical converter, providing an external electrical output, and providing a plurality of clock outputs. The method provides clock and data recovery, optical-to-electrical conversion, and multiple clock outputs. The method also includes providing the connector for an optical input, the clock and data recovery circuit, the decision circuit, the internal power supply, the optical-to-electrical converter, and the plurality of clock outputs in a single, stand-alone hardware unit. The method for multi-rate, high sensitivity clock and data recovery also provides an OC-192 data output. The method also includes an OC-192 (9.953-10.709 GHz) clock output and a ¼ OC-48 (2.488-2.677 GHz) clock output. The decision circuit provides a decision threshold level. The method provides that the decision threshold level is adjustable and optionally optimized by a user. The method provides that the circuit performs clock and data recovery at four OC-192 data rates, comprising 9.953, 10.3125, 10.664, and 10.709 Gb/s. The method provides that the data rates are digitally selectable and defined by control switching configuration. The method provides an optical input sensitivity range for detecting an optical signal measured from 0 dBM to approximately −23 dBm, with jitter increase from 0 dBm to −21 dBm of approximately 1 ps RMS. The method further provides protection circuitry. The protection circuitry includes voltage surge and reverse polarity protection and over-current protection. The method also further provides use of the CDR circuit coupled to a digital communications analyzer. In such a combination, a recovered clock of the clock and data recovery circuit provides trigger for the digital communications analyzer. The method also includes providing a built-in connector for an external electrical input. The method provides that trigger is achieved directly from an RF electrical input in substitution of an optical input. The method provides that RF signal evaluation is performed without the need for an optical input reference. An RF signal to be sampled is split between the clock and data recovery circuit and a digital communications analyzer, lock is achieved, and trigger provided. Finally, the method provides the conversion of an optical signal to an electrical signal, bypassing the clock and data recovery circuit.

Advantageously, this system and method for OC-192 multi-rate, high-sensitivity clock and data recovery provides multiple electrical clock outputs, including an OC-192 clock output, a ¼ (OC-48) clock output, and an OC-192 data output. Additionally, this system provides high-sensitivity to acquire low level optical input signals. For example, the optical input sensitivity is from 0 dBm to −23 dBm, with jitter increase from 0 dBm to −21 dBm of approximately less than 1 ps RMS. Also advantageously, the system is a stand-alone unit, not merely a plug-in unit. The system requires only a 48 Vdc input and uses only a minimal portion of signal to be sampled by the digital communication analyzer. The system is a cost-efficient unit, providing clock and data recovery at approximately one-sixth the cost of less-capable devices. Furthermore, the system does not require an optical input for RF electrical measurement.

Also advantageously, this system and method for OC-192 multi-rate, high-sensitivity clock and data recovery may be implemented in any OC-192 application requiring clock and data recovery for digital communication analyzer (DCA) optical eye measurements at transmission rates of 9.953, 10.3125, 10.664, and 10.709 Gb/s. Furthermore, the system and method may be used for optical-to-electrical (OE) conversion, radio frequency (RF) electrical measurements, and signal diagnostics.

Thus, there has thus been outlined, rather broadly, the features of the present invention in order that the detailed description that follows may be better understood, and in order that the present contribution to the art may be better appreciated. There are additional features of the invention that will be described and which will form the subject matter of the claims. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Additional aspects and advantages of the present invention will be apparent from the following detailed description of an exemplary embodiment which is illustrated in the accompanying drawings.

BRIEF DESCRIPTION OF THE DRAWINGS

The present invention is illustrated and described herein with reference to the various drawings, in which like reference numbers denote like system components and/or method steps, as appropriate, and in which:

FIG. 2 (all prior art) are diagrams illustrating eye pattern measurements of a signal resultant from the use of a system known in the art, illustrating, in particular, the degradation of the plug-in trigger, shown in FIG. 2 at −5 dBm, FIG. 3 (prior art) is a diagram illustrating eye pattern measurements of a signal resultant from the use of a system known in the art, illustrating, in particular, the degradation of the plug-in trigger, shown at −8 dBm.

FIG. 4 (prior art) is a diagram illustrating eye pattern measurements of a signal resultant from the use of a system known in the art, illustrating, in particular, the degradation of the plug-in trigger, shown at −13 dBm.

FIG. 5 is a diagram illustrating an eye pattern measurement of a signal resultant from the of the system for multi-rate, high-sensitivity clock and data recovery, illustrating, in particular, a wide open eye and very little jitter, indicative of the quality of the signal, shown at −5 dBm.

FIG. 6 is a diagram illustrating an eye pattern measurement of a signal resultant from the of the system for multi-rate, high-sensitivity clock and data recovery, illustrating, in particular, a wide open eye and very little jitter, indicative of the quality of the signal, shown at −13 dBm.

FIG. 7 is a diagram illustrating an eye pattern measurement of a signal resultant from the of the system for multi-rate, high-sensitivity clock and data recovery, illustrating, in particular, a wide open eye and very little jitter, indicative of the quality of the signal, shown at −21 dBm.

FIG. 8 is a diagram illustrating an eye pattern measurement of a signal resultant from the of the system for multi-rate, high-sensitivity clock and data recovery, illustrating, in particular, a wide open eye and very little jitter, indicative of the quality of the signal, shown at −23 dBm.

FIG. 9 is a diagram illustrating an eye pattern measurement of a signal resultant from the system for multi-rate, high-sensitivity clock and data recovery that has been enhanced with even greater input sensitivity to recover clock with a direct input as low as −30 dBm with less than 1 ps jitter increase from 0 dBm to −30 dBm, shown here at −2 dBm.

FIG. 10 is a diagram illustrating an eye pattern measurement of a signal resultant from the system for multi-rate, high-sensitivity clock and data recovery that has been enhanced with even greater input sensitivity to recover clock with a direct input as low as −30 dBm with less than 1 ps jitter increase from 0 dBm to −30 dBm, shown here at −30 dBm.

DETAILED DESCRIPTION OF THE INVENTION

Figure 1:
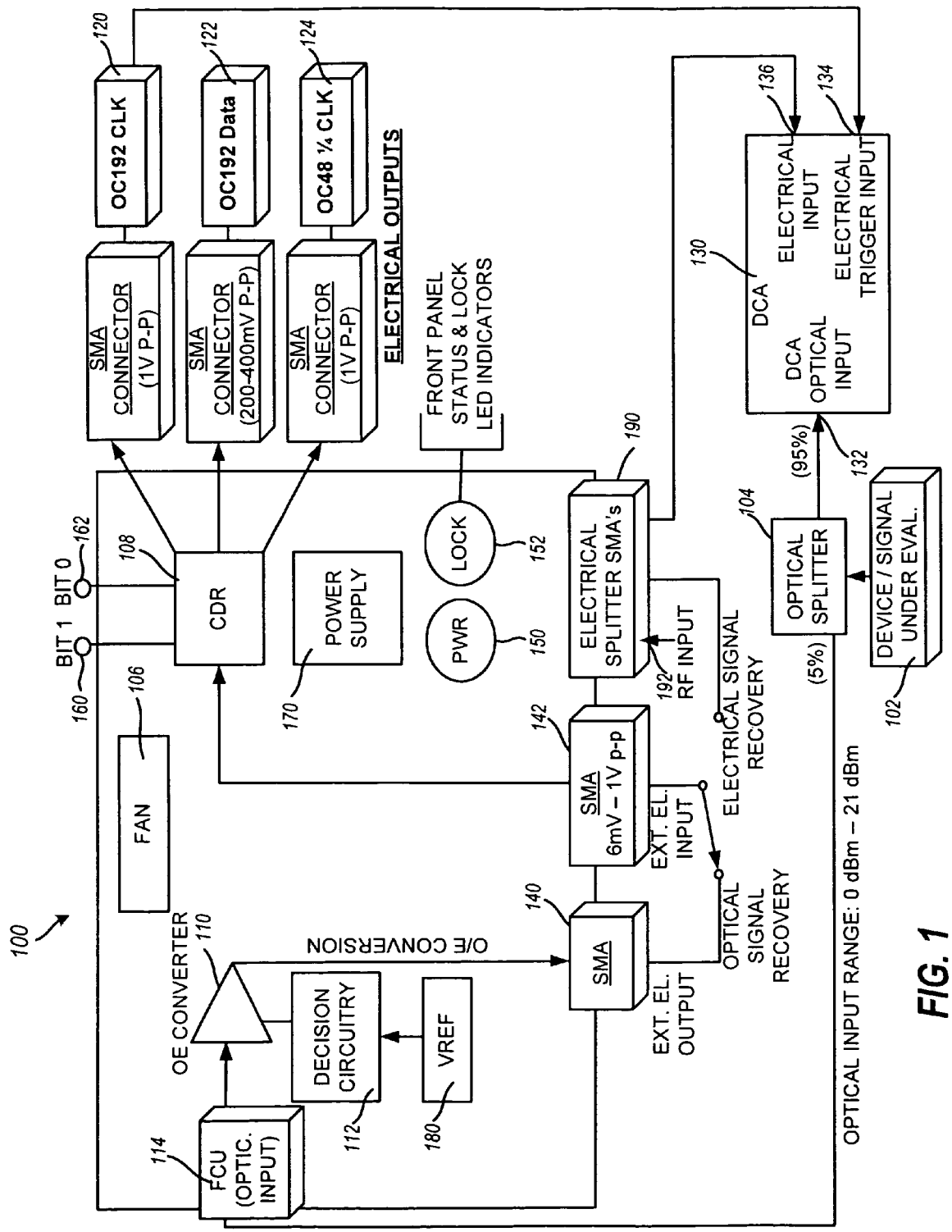
FIG. 1 is a block diagram illustrating a system for multi-rate, high-sensitivity clock and data recovery (CDR), according to an embodiment of the present invention.

Before describing the disclosed embodiments of the present invention in detail, it is to be understood that the invention is not limited in its application to the details of the particular arrangement shown here since the invention is capable of other embodiments. Also, the terminology used herein is for the purpose of description and not of limitation.

The present invention provides a system 100 and method for multi-rate, high-sensitivity clock and data recovery, including a variable/adjustable decision threshold, RF input clock recovery, and an optical-to-electrical conversion feature. The system 100 and method also provide multiple clock outputs, including an OC-192 clock output 120, a ¼ (OC-48) clock output 124, and an OC-192 data output 122. The system 100 is highly-sensitive to low optical input levels. Direct optical input levels to the system 100 are as low as −23 dBm. The system is assembled as a stand alone, cost-efficient unit.

Referring now to FIG. 1, a system 100 for an OC-192 multi-rate, high-sensitivity clock and data recovery (CDR) is shown. The CDR system 100 includes a connector for an optical input 114. As shown, the connector for an optical input 114 is an FCU connector. The CDR system 100 also includes a clock and data recovery circuit 108. The clock and data recovery circuit 108 provides a recovered clock of the input signal entering the optical input signal 102 entering the connector for an optical input 114.

The system 100 includes an optical splitter 104. The optical splitter 104 splits the power of the optical signal 102 that is under evaluation and allows the optical signal 102 to be used by both the clock and data recovery circuit 108 and a digital communications analyzer 130. For example, as shown in FIG. 1, a minimal portion (5%) of the power of the optical signal 102, entering the connector for optical input 114, is directed toward the clock and data recovery circuit 108, while another portion (95%) of the power of the optical signal 102, is directed toward the digital communications analyzer 130 entering the DCA optical input 132. The optical splitter ratio selected by the user for a test configuration must take into account the DCA 130 input level sensitivity. Because of unit sensitivity capability, only a minimal amount of the signal is required, therefore allowing the larger portion of light through the optical splitter 104 to be used by the DCA optical input 132, since the user may be limited by DCA input level sensitivity. Optionally, other optical splitter ratios are used. For example, a user optionally uses a 50/50 optical splitter. Since the CDR unit 108 only requires a small amount of signal level for recovery, the majority of the signal may be used to feed the DCA 130 in applications where a low level signal is to be analyzed. Any signal greater than −11 dBm works with a 50/50 optical splitter. For signals less that −11 dBm, the user optionally selects a different ratio (i.e., 75/25, 80/20, 90/10, 95/5). If, however, the DCA 130 used in the configuration has extra input sensitivity, the splitter ratio is irrelevant.

The system 100 performs clock and data recovery at four OC-192 data rates, including 9.953, 10.3125, 10.664, and 10.709 Gb/s. The data rates are digitally selectable and defined by the control switching configuration. The control switching configuration includes a first and second indicator bit 160, 162. There are four states in which the first and second indicator bits 160, 162 are used in order to select the data rate. For example, when the rate of 10.709 GHz is desired, bit 1 160 is set to 0 and bit 2 162 is set to 0. When the rate of 10.664 GHz is desired, bit 1 160 is set to 1 and bit 2 162 is set to 0. When the rate of 10.3125 GHz is desired, bit 1 160 is set to 0 and bit 2 162 is set to 1. When the rate of 9.953 GHz is desired, bit 1 160 is set to 1 and bit 2 162 is set to 1. Thus, the system 100 provides clock and data recovery at four OC-192 data rates. The recovered output clock level is approximately 1 v peak-peak. The OC-192 data output is approximately 200-400 mV peak-peak.

The system for multi-rate, high-sensitivity CDR 100 also includes a decision circuit 112. The decision circuit 112 includes a decision threshold level. The decision threshold level is adjustable and optimized by a user of the system 100. A reference voltage 180 is provided for the decision circuit 112. The system 100 has an optical input sensitivity range for detecting an optical signal 102 measured from 0 dBM to approximately −23 dBm, with jitter increase from 0 dBm to −21 dBm of approximately less than 1 ps RMS. The internal decision circuit 112 provides an offset voltage 180 for the on-board optical to electrical converter 110. The converted optical input signal is internally compared with this adjustable voltage to determine the output states of the O/E converter 110, what the O/E converter 110 would consider either a 0 or 1 dependent on where the threshold level is set. In the decision circuit 112, a potentiometer varies the gain of the end stage operational amplifier that feeds an offset voltage 180 to the O/E converter 110. By manually adjusting the potentiometer on the printed circuit board, while decreasing input level and monitoring signal status or eye pattern quality on the DCA 130, the user can optimize this circuit for best input level response and signal recovery. Though the decision threshold level can be adjusted by the user, the level is, however, preset and optimized in-house.

The system 100 also includes a plurality of clock OC-192 outputs 120, 124. In addition to including an OC-192 data output 122, the system for clock and data recovery 100 also includes an OC-192 (9.953-10.709 GHz) clock output 122 and a ¼ OC-48 (2.488-2.677 GHz) clock output 124. The OC-192 data output 122, OC-192 clock output 122, and the ¼ OC-48 clock output 124 are electrical outputs of the system 100 using SMA, coaxial RF, connectors that are 50 Ohm, AC coupled. The OC-192 clock output 122 is a selectable rate clock output. The available rates for selection are OC-192 9.953, 10.3125, 10.664, and 10.709 Gb/s. The OC-192 rate is selected with the external rate configuration switches 160, 162.

The system 100 also includes an internal power supply 170 comprising a plurality of voltage supply sources. Internal multiple voltage supply sources are −5.2 v, +5.2 v, +9 v, and −3.7 v. The −3.7 v voltage supply source is optionally used with a secondary optical receiver (not shown). The system for multi-rate, high-sensitivity CDR 100 requires only a 48 Vdc input. The required input voltage of 48 Vdc has a current draw of less than 2 A. The power supply 170 further includes protection circuitry. The power supply 120 protection circuitry at the 48 Vdc input includes both voltage surge and reverse polarity protection and over-current protection through fuse.

The system for multi-rate, high-sensitivity CDR 100 is used in combination with a digital communications analyzer 130. In such a combination, a recovered clock from the clock and data recovery circuitry 108 is needed by the digital communications analyzer 130 for performing optical and electrical eye pattern measurements. (An example eye pattern measurement is shown in FIG. 2.) The digital communications analyzer 130 includes a DCA optical input 132 and an electrical trigger input 134. The electrical trigger input 134 receives, for example, an electrical trigger input that is needed for RF or optical signal measurements, or both. The recovered RF electrical trigger input 134 is used for optical or electrical eye measurement applications, RF signal tracking, and diagnostics.

A recovered clock of the clock and data recovery circuit 108 provides trigger for the digital communications analyzer 130. Optionally, the system triggers directly from an RF electrical input in substitution of an optical input 102. Thus, RF signal evaluation may be performed without the need for an optical input 102 reference if desired. The RF electrical input feeds into the input for RF signal evaluation 192 of the electrical splitter 190. The electrical splitter 190 will route through its outputs to the DCA electrical input 136 and the external electrical input 142 of the clock and data recovery circuit 108. The internal electrical splitter 190 optionally is used as a splitter for other test, research, and development purposes. The external electrical input 142 is also an SMA, coaxial RF, connector that is 50 Ohm, AC coupled, 1 V peak-peak. A clock can still be obtained with signal directly coupled to input 142 should a clock alone be needed for various R&D use. In this scenario, RF signal evaluation is performed without the need for an optical input 102 reference. By splitting an RF signal to be sampled by both the clock and data recovery circuit 108 and the digital communications analyzer 130, lock is achieved and trigger provided to the digital communications analyzer 130. A manual connection bypasses the optical input 102, and will instead reference the manually connected RF input for clock and data recovery. Thus, RF input clock recovery is provided. This is helpful for in-circuit signal tracing in applications where the end result RF signal is not used to produce an optical output so one is not available, or optical output or drive circuitry is faulty and unable to produce an optical signal until fault is diagnosed and resolved.

The system for multi-rate, high-sensitivity CDR 100 also includes an optical-to-electrical converter 110 and a connector for an external electrical output 140. The connector for an external electrical output 140 is also an SMA, coaxial RF, connector that is 50 Ohm, AC coupled, 1 V peak-peak. The system 100 is optionally used for the conversion of an optical signal 102 to an electrical signal, bypassing the clock and data recovery circuit 108. For example, the system 100 is used to convert a 10 Gb/s optical signal to an electrical signal. The signal interfaces the clock and data recovery circuit 108 in one embodiment and bypasses the clock and data recovery circuit 108 in another embodiment.

The system for multi-rate, high-sensitivity clock and data recovery 100 is assembled in a single, stand-alone hardware unit, providing greater portability and cost-effectiveness than plug-in modules known in the art. The system 100 includes a fan 106, for the purpose of cooling all internal devices and components located within the stand-alone hardware unit. The system 100 includes a power status LED indicator 150 and a lock status LED indicator 152. The lock status LED indicator 152 is lit after clock recovery when the phase is locked. The power status LED indicator 150 and the lock status LED indicator 152 are optionally located on the front panel of the system 100 as well as the power ON/OFF switch (not shown).

The system for multi-rate, high-sensitivity clock and data recovery 100 is implemented, for example, in any OC-192 application requiring clock and data recovery for digital communications analyzer optical eye pattern measurements at OC-192 rates of 9.953, 10.3125, 10.664, and 10.709 Gb/s. The system 100 is also implemented, for example, for optical-to-electrical conversion, RF electrical measurements, and signal diagnostics. The system 100 is used in various embodiments, for example, with the Ciena CN4200, various optical/electrical product test configurations, and non-optical/electrical test 10 G products such as Ciena Core Stream products, UHD, G.709 Transceiver test configuration set-up, and troubleshooting applications. The system 100 is also used, for example, in 10 G CSD (Core-Director) testing, ONI 10 G, and Ciena Core Stream C-Band test and diagnostic configurations.

Referring now to FIGS. 2, 3, and 4 (all prior art), eye pattern measurement diagrams 200, 300, 400 are shown, illustrating eye pattern measurements 200, 300, 400 of a signal resultant from the use of a system already known in the art. The degradation of the plug-in trigger is shown in FIG. 2 200 at −5 dBm, in FIG. 3 300 at −8 dBm, and in FIG. 4 400 at −13 dBm. As the input signal is attenuated, the plug-in trigger begins to degrade. In FIG. 4 400, at −13 dBm, the DCA parameters are no longer valid.

Referring now to FIGS. 5, 6, 7, and 8, diagrams are shown illustrating an eye pattern measurement 500, 600, 700, 800 of a signal resultant from the system for multi-rate, high-sensitivity clock and data recovery. The eye pattern measurement diagrams 500, 600, 700, 800 each show a wide open eye and very little jitter, indicative of the "goodness" of the signal. The eye pattern measurement shown in FIG. 5 500 is at −5 dBm, in FIG. 6 600 at −13 dBm, FIG. 7 700 at −21 dBm, and FIG. 8 800 at −23 dBm.

Referring now to FIGS. 9 and 10, eye diagrams 900, 1000 are shown, illustrating an eye pattern measurement of a signal resultant from the system for multi-rate, high-sensitivity clock and data recovery that has been enhanced with even greater input sensitivity to recover clock with a direct input as low as −30 dBm with less than 1 ps jitter increase from 0 dBm to −30 dBm. The eye pattern measurement shown in FIG. 9 900 is at −2 dBm and in FIG. 10 1000 at −30 dBm.

Although the present invention has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A system for multi-rate, high-sensitivity clock and data recovery, comprising:
    a connector for an optical input;
    a clock and data recovery circuit, wherein the clock and data recovery circuit performs clock and data recovery at a plurality of data rates that are digitally selectable and defined by a control switch configuration;
    a decision threshold circuit;
    an internal power supply comprising a plurality of voltage supply sources;
    an optical-to-electrical converter;
    an external electrical output;
    a plurality of clock outputs; and
    a connector for an external electrical input, wherein the system utilizes an RF electrical input, wherein RF signal evaluation is performed without the need for an optical input reference, and wherein an RF signal is split between the clock and data recovery circuit and a digital communications analyzer, lock is achieved, and a trigger is provided;
    wherein the system provides clock and data recovery, optical-to-electrical conversion, and the plurality of clock outputs; and
    wherein the system for multi-rate, high-sensitivity clock and data recovery is comprised in a single, stand-alone hardware unit.

2. The system for multi-rate, high sensitivity clock and data recovery of claim 1, further comprising:
    an OC-192 data output.

3. The system for multi-rate, high sensitivity clock and data recovery of claim 1, wherein the plurality of clock outputs comprises:
    an OC-192 clock output; and
    an OC-48 clock output.

4. The system for multi-rate, high sensitivity clock and data recovery of claim 1, wherein the decision circuit comprises a decision threshold level, wherein the decision threshold level is adjustable.

5. The system for multi-rate, high sensitivity clock and data recovery of claim 1, wherein the system has an optical input sensitivity range for detecting an optical signal measured from 0 dBm to approximately −23 dBm, with jitter increase from 0 dBm to −21 dBm of approximately less than 1 ps RMS.

6. The system for multi-rate, high sensitivity clock and data recovery of claim 1, wherein the power supply further comprises:
    protection circuitry, wherein the protection circuitry comprises voltage surge and reverse polarity protection and over-current protection.

7. The system for multi-rate, high sensitivity clock and data recovery of claim 1,
    wherein the system is coupled to the digital communications analyzer; and
    wherein a recovered clock of the clock and data recovery circuit provides trigger for the digital communications analyzer.

8. A method for multi-rate, high sensitivity clock and data recovery, comprising:
    providing a connector for an optical input;
    providing a clock and data recovery circuit, wherein the clock and data recovery circuit performs clock and data recovery at a plurality of data rates that are digitally selectable and defined by a control switch configuration;
    providing a decision threshold circuit;
    providing an internal power supply comprising a plurality of voltage supply sources;
    providing an optical-to-electrical converter;
    providing an external electrical output;
    providing a plurality of clock outputs; and
    providing a connector for an external electrical input and utilizing an RF electrical input, wherein RF signal evaluation is performed without the need for an optical input reference; and wherein an RF signal is split between the clock and data recovery circuit and a digital communications analyzer, lock is achieved, and a trigger is provided
    wherein the method provides clock and data recovery, optical-to-electrical conversion, and the plurality of clock outputs; and
    providing the connector for an optical input, the clock and data recovery circuit, the decision circuit, the internal power supply, the optical-to-electrical converter, and the plurality of clock outputs in a single, stand-alone hardware unit.

9. The method for multi-rate, high sensitivity clock and data recovery of claim 8, further comprising:
    providing an OC-192 data output.

10. The method for multi-rate, high sensitivity clock and data recovery of claim 8, wherein the plurality of clock outputs comprises:
    an OC-192 clock output; and
    an OC-48 clock output.

11. The method for multi-rate, high sensitivity clock and data recovery of claim 8, wherein the decision circuit comprises a decision threshold level, wherein the decision threshold level is adjustable.

12. The method for multi-rate, high sensitivity clock and data recovery of claim 8, wherein the method provides an optical input sensitivity range for detecting an optical signal measured from 0 dBm to approximately −23 dBm, with jitter increase from 0 dBm to −21 dBm of approximately less than 1 ps RMS.

13. The method for multi-rate, high sensitivity clock and data recovery of claim 8, wherein the power supply further comprises:
    providing protection circuitry, wherein the protection circuitry comprises voltage surge and reverse polarity protection and over-current protection.

14. The method for multi-rate, high sensitivity clock and data recovery of claim 8,
    wherein the method is used coupled to the digital communications analyzer; and
    wherein a recovered clock of the clock and data recovery circuit provides trigger for the digital communications analyzer.

* * * * *